United States Patent [19]

Kitano et al.

[11] 3,791,237
[45] Feb. 12, 1974

[54] DIFFERENTIAL

[75] Inventors: Shin Kitano; Tooru Kagata, both of Toyota, Japan

[73] Assignee: Aisin Seiki Kabushiki Kaisha, Aichi Pref., Japan

[22] Filed: Apr. 21, 1971

[21] Appl. No.: 136,139

[52] U.S. Cl. .................................... 74/711
[51] Int. Cl. .................................... F16h 1/44
[58] Field of Search .................... 74/710.5, 711

[56] References Cited
UNITED STATES PATENTS

| | | | |
|---|---|---|---|
| 1,481,889 | 1/1924 | Carhart | 74/711 |
| 2,850,922 | 9/1958 | Welsh | 74/711 |
| 1,750,981 | 3/1930 | Wildhaber | 74/711 |
| 2,720,796 | 10/1955 | Schou | 74/711 |
| 2,850,922 | 9/1958 | Welsh | 74/711 |
| 2,855,806 | 10/1958 | Fallon | 74/710.5 |
| 2,966,076 | 12/1960 | O'Brien | 74/710.5 |
| 3,053,114 | 9/1962 | Singer | 74/711 |
| 3,233,477 | 2/1966 | O'Brien | 74/710.5 |
| 3,253,672 | 5/1966 | Mikina | 74/710.5 |
| 3,264,900 | 8/1966 | Hartupee | 74/711 |
| 3,313,180 | 4/1919 | Balfour et al. | 74/711 |

*Primary Examiner*—C. J. Husar
*Attorney, Agent, or Firm*—Pierce, Scheffler & Parker

[57] ABSTRACT

A differential applicable to an automobile in which variations between the speeds of the wheel axles is regulated in accordance with the actual speed of the axles compared with the speed of the differential housing by a cam means which translates the variations in speed of the wheel axles compared with the speed of the differential housing into porportional increases in the pressure applied to a multiple disc friction clutch means for producing a resultant braking force, which force returns back to the cam means and is thus translated again into further pressure increases to the clutch means to cause the clutch discs to engage more tightly to each other.

2 Claims, 14 Drawing Figures

DIFFERENTIAL

BACKGROUND OF THE INVENTION

This invention relates to improvements in locking a differential mechanism and more particularly to the means for restraining a faster rotation of one drive wheel when the wheel tends to accelerate because of bounce from the road or because of being on a low traction surface such as ice or the like.

It is a principal object of the present invention to provide a differential construction in which every discrepancy of speed of the axles is regulated in dependency upon the actual speed of the axles compared with the speed of the differential housing in a manner such that cam means translates the discrepancy into an increase of pressure on a multiple disk friction clutch and resultant braking force from the clutch returns back to the cam means and is thus translated again into the further pressure.

It is another object of the present invention to provide a locking differential in which the force F between the cam face and the cam follower is defined by the following equation at various operative positions of the follower on the cam face.

$F = L2 \times F1 / L1$ $F$ is the said force, $F1$ is a resultant braking force acting on the transmitting means, $L1$ is a distance between the axis of the axles and the operative positions of the transmitting means on the cam faces and $L2$ is the distance between the axis of the axles and the position where the resultant braking force is applied on the transmitting means, whereby the braking force is exaggerated on the cam face with the consequence that the exaggerated braking force is exactly translated again back into the pressure into the clutch means.

It is another object of the present invention to provide such locking differential in which spring means is provided to initiate the regulating function of the differential by always pressing the clutch means in addition to the side gear thrust (from the bevel gear teeth) which always applies pressure to the clutch means.

It is another object of the present invention to provide a locking differential of simple construction in which the cam means is directly mounted in the case.

Another object of the invention is to provide a locking differential in which one set of alternate clutch plates are loosely bolted together for the sake of readiness of adjusting the preset pressure against the clutch means.

Another object of the invention is to provide a locking differential in which a cam means is a resilient curved plate-form spring effective in noiseless smooth operation and thus in avoiding the strain of the cam assembly.

Another object of the invention is to provide a differential in which locking mechanism is beneficially installed within the usually unused space of the differential housing.

Still another object of the present invention is to provide a differential in which spring retainers are also used to exaggerate the braking force on the operative position on the cam face.

SUMMARY OF THE INVENTION

A differential in which every discrepancy of speed of the axles is regulated in dependency upon the actual speed of the axles compared with the speed of the differential housing in a manner such that cam means translates the discrepancy into an increase of the pressure to the multiple disk or plate friction clutch means and resultant braking force from the clutch means returns back to the cam means and is thus translated again into the further pressure to the clutch means to have its clutch plates further tightened to each other.

DESCRIPTION OF THE PREFERRED EMBODIMENTS

Figure 6:
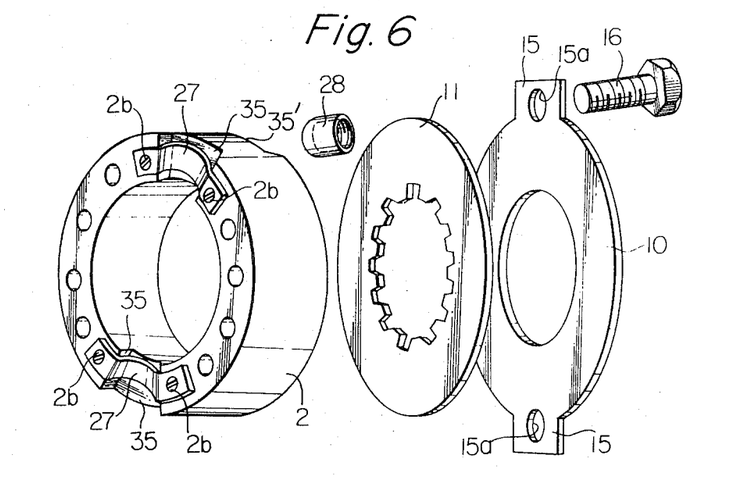
FIG. 6 is an exploded view of parts of the mechanism.

FIGS. 1–6 of the drawings show the present invention embodying a three-piece case 100 comprising the body 3, cap 1 and cylindrical middle block 2 interposed therebetween. These three pieces are connected to each other as shown by suitable means such as the screws 25 one of which appears at the right side of the bottom of FIG. 2. The numeral 25a indicates holes in the case for receiving the screws 25. The cap 1 is flanged to the ring gear 23 by suitable means such as the cap screws 24 and holes provided in the as shown at 24a. The case is rotatably supported in the usual manner in an axle housing (not shown) by roller bearings (not shown). Side gears 5 and 5' are disposed in the case and are backed by multiple plate friction clutches shown generally by the numerals 9 and 9' respectively. Axle shafts 30 and 30' are splined to the inside of the side gears 5 and 5' respectively. Disposed between the side gears 5 and 5' is a spider 19 supported at both its ends by the cylindrical middle block 2. Two holes 18 are provided at diametrically opposed positions in the wall of the middle block 2 to support the spider 19 at both ends thereof. A hole 20' is provided at one end of the spider 19 in alignment with a hole 20 in the middle block 2 into which another pin 21 fits as retainer means to keep the spider from falling out. Two pinion gears 6 and 6' are free to rotate on the spider 19 in toothed engagement with the side gears 5 and 5'. These two pinion gears are backed respectively by thrust washers 6a and 6'a. The clutch 9 is built up in the usual form for disc clutches, that is, with two alternate series of discs, one keyed to the normal driving member, case 100, and the other to the hub of the driven member, side gear 5. One series of clutch plates or discs 11 in a set is provided with internal projections to loosely fit longitudinal slots in the hub of the side gear 5 shown at 34 in FIG, 2, while the other discs have external projections 15 loosely fitting the internal slots 33 of the driving cap 1 of the case 100. A pair of pressure rings 13 and 14 are provided on both sides of the clutch 9 so that the discs of the clutch may be clamped between these pressure rings as will be described further hereinbelow. Bolts 16 are provided to be loosely inserted through aligned holes 15a formed in the projections 15 of each clutch plate 10 as shown in FIG. 6 and aligned holes formed in both pressure rings 13 and 14. The head of each of the bolts 16' and the cap nuts 28' screwed onto the other end thereof always serve together with pressure rings 13 and 14 to keep residual pressure on the discs of the clutch 9 as will be hereinafter described the bolts serving to connect the pressure rings with the clutch plates 10 to rotate therewith. Disposed between the outermost clutch plate 10 and the outermost clutch plate 11 is an annular dish shaped plate spring 12 to divide the clutch plates into two groups so that the two groups are always kept resiliently apart from each other in a direction parallel to the axis of shaft 30, thus providing the residual pressure mentioned above.

The outer end of each of the cap nuts 28' serves as a cam follower cooperating with one of cam faces, which in this instance are curved spring plates 27' (FIG. 6) fixed at their ends to the middle block 2 by means of bolts or pins 2b. Recesses 35 are formed in the side faces of the block 2 axially in back to back relation to the recess in the other face so that each may receive the springs 27' as shown in FIG. 6. Due to a correctly selected resiliency of the spring 27, smooth and noiseless operation of the cam means may be effected.

On the right side of the differential, similar construction of the clutch 9' is provided.

Figure 2:
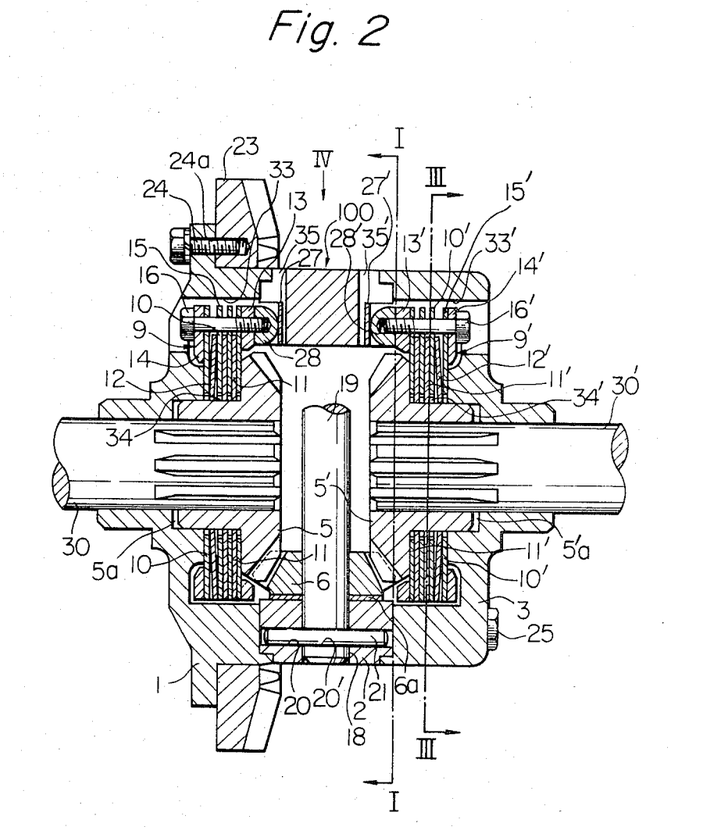
FIG. 2 is a sectional view taken along the line II—II of FIG. 1.
Figure 3:
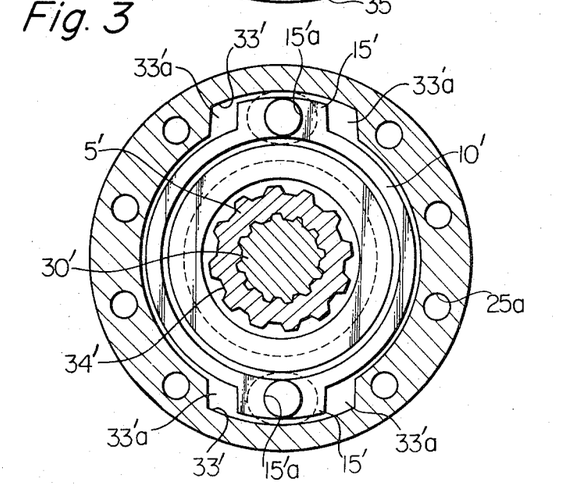
FIG. 3 is a sectional view taken along the line III—III of FIG. 2.
Figure 4:
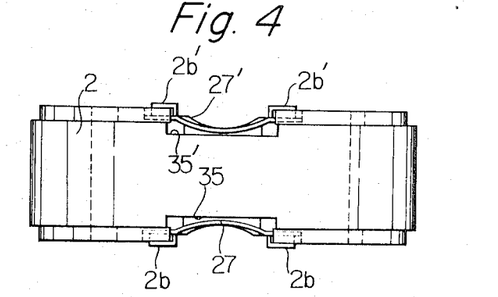
FIG. 4 is a plan view as viewed along the arrow IV indicated in FIG. 2.
Figure 5:
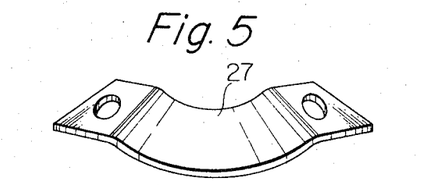
FIG. 5 is a perspective view of the cam spring.

It should be noted that parts of the clutch 9' on the right side of FIG. 2 which are the same as those of the clutch 9 are given the same numeral with a prime. For simplicity, description of the parts marked with the primed numerals will be hereinafter abbreviated, relying upon the drawings for clarification.

In operation of the device of FIGS. 1–6 as applied to an automobile, power is applied from an engine and drive linkage (not shown) in the conventional manner to rotate the drive ring gear 23. The case composed of sections 1, 2 and 3 which is affixed to the ring gear 23 is rotated therewith.

Under ordinary conditions, the rotation of the gear 23 causes side gears 5 and 5' to both revolve at the same rate of speed, since the connecting pinion gears 6 and 6' are moved around with the case, but do not revolve about their own axes. All of the torque during straightway driving is transmitted to the wheels through this operation rather than through the clutches 9 and 9'. An equal tractive force is thus given to each of the two wheels and, at the same time, either of them is permitted to run ahead or lag behind the other as may be required in rounding curves or riding over obstructions as will be understood as the description proceeds.

It should be noticed that there is no operation of the clutches 9 and 9' during this ordinary operation of the device, since there is no rotation of the side gears relative to the case 100. However, when variations of the rotational speed of the two side gears 5 and 5' occurs such relative rotation of the side gears to the case results in the operation as hereinbelow described.

Firstly, assuming a left turn with the automobile provided with the differential in FIGS. 1–6, the side gear 5 on the inside of the turn slows down to the speed of the inside wheel (not shown) which is below the rotational speed of the case, whereas the outside wheel (not shown) increases the rotational speed of its associated side gear 5' so that it is faster than the rotational speed of the case 100. At first it seems likely that clutch 9' will obstruct such faster rotation of the side gear 5' and will defeat the purpose of the ordinary differential gearing mechanism. However, it has been found in actual test that in most cases when the automobile is turning a corner the inside wheel of the turn ordinarily tends to bounce from the traveled surface or road. The inside wheel will thus tend to accelerate since the momentary traction presented to the wheel is almost zero.

The clutch of the present invention will in this circumstance restrain such tendency since the clutch plates are continuously tightenend to each other by the dish shaped spring 12 as well as the side gear thrust from the bevel gear teeth directly transmitted into the clutch stack without any tendency of the hub of the side gear to bear against the wall of the case. It should be noted that the case is now rotating slower than the side gear 5, and is driven by the side gear 5, because of its connection to there through the clutch plates 11 splined to the hub of the side gear 5, and clutch plates 10 as well as cap nuts 28 which are solidly connected for rotation with the clutch plates 10 and thus the cam means as will be hereinafter described.

The acceleration of the side gear 5 will cause the cap nuts 28 to slide up on the cam surfaces of the cam springs 27 the rotational speed of which is now less than the rotational speed of the cap nuts 28. As the cap nuts 28 move up on the cam surface of the cam springs, the pressure ring 13 moves axially toward the pressure ring 14. This axial movement exerts pressure in addition to the force of the spring 12 against the clutch plates and thence in turn against the internal surface of the case across the outside pressure ring 14 so that the greater the movement of ring 13, the greater the pressure on the clutch plates. When this happens, the clutch means 9 becomes the brake clutch means for the side gear 5. The increasing braking force will return back to the cam assembly with the consequence that the cap nuts 28 will further move up on the higher rises of the cam springs 27 and thence the further axial movement of the pressure ring 13 is effected, rapid restraining of the acceleration of the side gear 5 thus resulting from such circular operation.

Since the acceleration of the side gear 5 is thus restrained as above described, the rotational speed of the opposite side gear 5' will be increased a corresponding amount so that it is faster than the rotational speed of the case. Such increase of the rotational speed of the side gear 5' will also be restrained by the clutch 9' in the same manner as that hereinbefore described. However, it will be rather appreciated that the outside gear 5' of the turn is always urged to hold the tendency to maintain the required torque for the drive wheel when the other side wheel encounters a low traction condition.

It will be understood that the same result as that described above will be obtained when one driving wheel bounces from the traveled surface or road, or is on a low traction surface.

It should be noted that there is a substantial clearance as at 33'a (FIG. 3) between each lug 15' and the internal surface of the corresponding groove 33' of the case, to permit some amount of rotational movement of the outer plates 10' relative to the case, so that the pole 28' may move up on the cam rise of the cam spring 27'.

Figure 1:
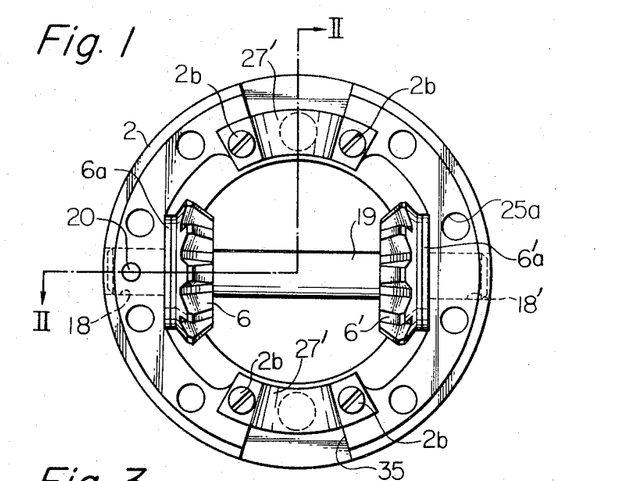
FIG. 1 is a sectional view taken along the line I—I of FIG. 2.

Further it should be noted that pinion thrust from the flat surfaces of the pinion gears 6 and 6' is transmitted into flat tangent surfaces of the middle block 2 across the thrust washers 6a and 6'a as shown in FIG. 1.

Still further it should be noted that outside surfaces of the side gears 5 and 5' transmit side gear thrust (from the bevel gear teeth) directly into the clutch stacks and consequently without any tendency of the hub of the side gear to bear against the wall of the case. There is substantial clearance provided at 5a and 5'a between the hub of the side gears 5 and 5' and the wall of the case.

From the preceding, it will be noted that under ordinary conditions, the rotation of the case 100 causes the side gears 5 and 5' to both revolve at the same rate of speed, since the connecting pinion gears 6 and 6' are moved around with the case 100, but do not about their own axes and when either of the wheels tends to run ahead or lag behind the other as may be required or may happen in rounding curves or on a low traction surface every discrepancy of rotational speed of the driving wheels may be restrained.

Further it should be noted that the greater the tendency of the discrepancy the larger will be the prevention thereof. This is very important to obtain the reqired result of the embodiment according to the present invention.

FIGS. 7-11 of the drawings show the invention embodying a one-piece case. Parts which are the same as those shown in FIGS. 1-6 are given the same number in a 200 series. The case in this embodiment is indicated at 200. Such symbolization will permit some abbreviations of duplicate description as to the same parts. This will be true of the parts marked the same number with prime, too. There are two generally rectangular windows 250 in the opposite sides of the case. The windows are arcuately cut-out of opposed sides as will be seen in FIG. 9. This permits parts of the mechanism to be inserted through the windows.

Figure 7:
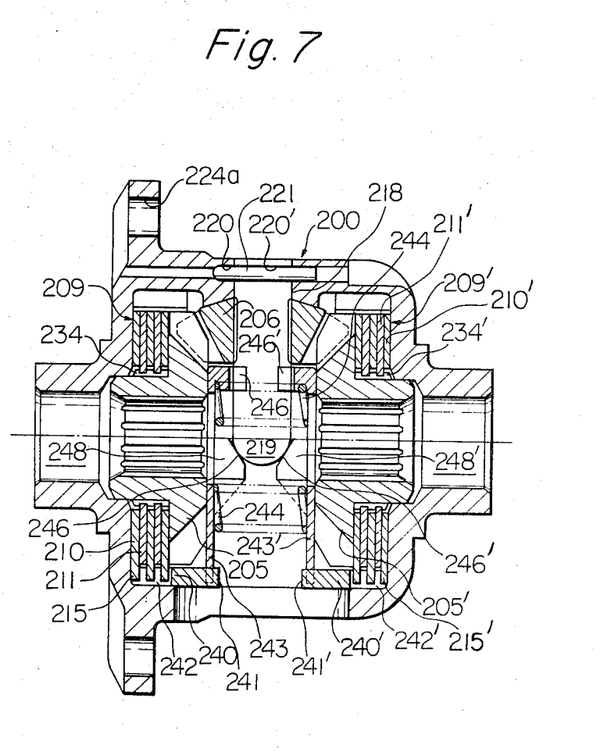
FIG. 7 is a sectional view taken along the line VII—VII of FIG. 8.
Figure 8:
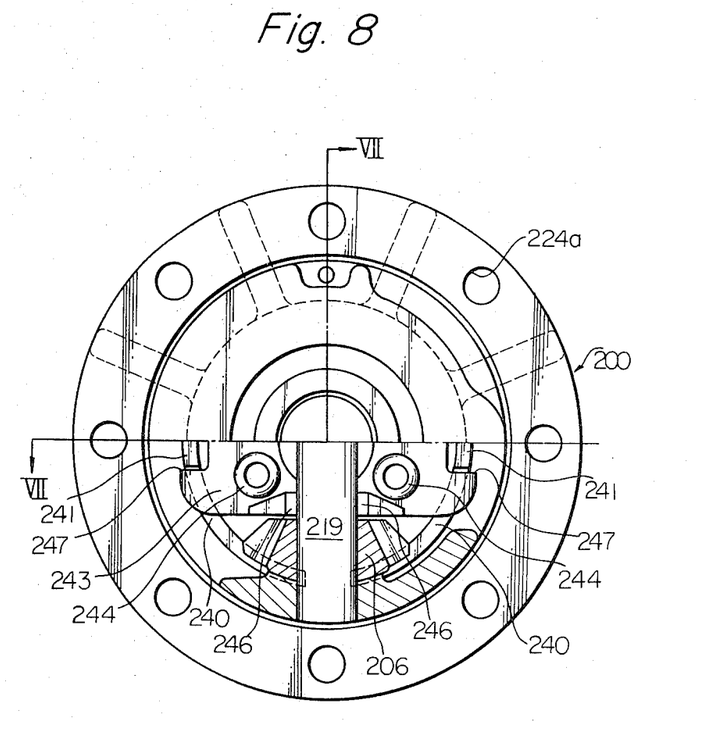
FIG. 8 is a side view as viewed along the arrow VIII indicated in FIG. 9, the lower half of which shows inside of the device.
Figure 9:
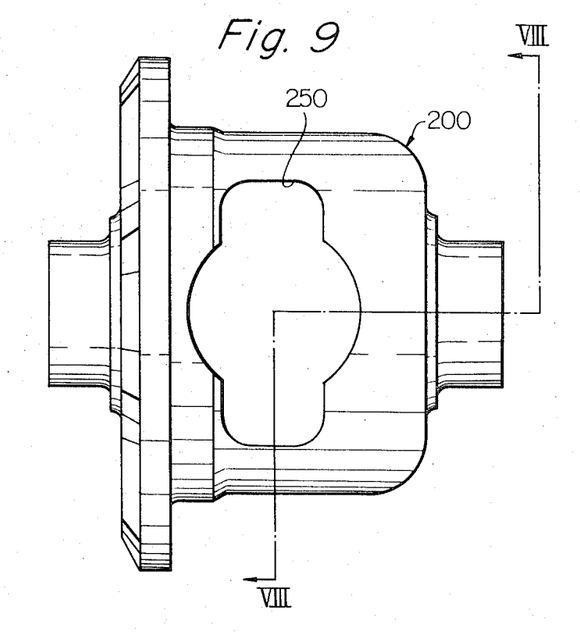
FIG. 9 is an elevational view of the case.
Figure 10:
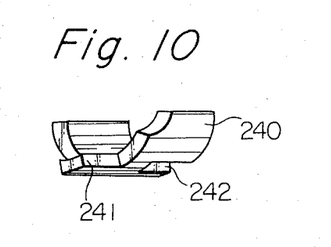
FIG. 10 is a perspective view of the collar.
Figure 11:
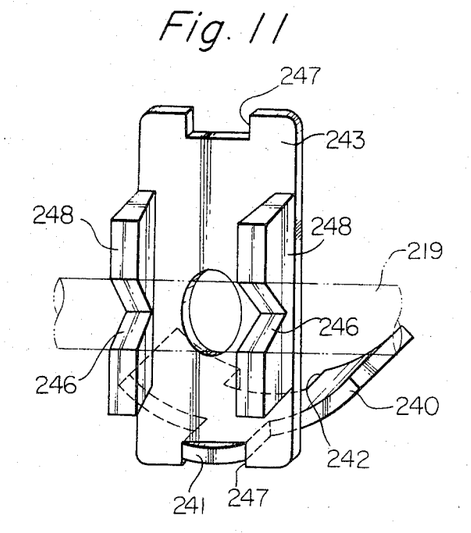
FIG. 11 is a perspective view of the spring retainer in which the pinion gear pin or spider is shown in phantom.

A pair of multiple plate friction clutches 209 and 209' are mounted on the hubs of the both side gears 205 and 205' disposed within the case 200. Axle shafts (not shown) are splined to the inside of the side gears 205 and 205' respectively. Disposed between the side gears is a spider 219 supported at its ends by the wall of the case. Two holes 218 are provided at diametrically opposed positions in the wall of the case to support the spider 219 at both ends thereof. A hole 220' is provided at one end of the spider in alignment with a hole 220 in the wall of the case. A pin 221 fits these holes as retainer means to keep the spider from falling out. Two pinion gears 206 and 206' are free to rotate on the spider 219 in toothed engagement with the side gears 205 and 205'. The clutch 209 is built up in the usual form for disc clutches, that is, with two alternate series of discs, one keyed to the arcuate collars 240 to be described hereinafter and the other to the hub of the driven member, side gear 205. One series of clutch plates or discs 211 in a set is provided with internal projections to loosely engage longitudinal slots on the hub of the side gear 205 shown at 234 in FIG. 7, while the other discs 210 have external projections 215 loosely fitting the recesses 242 formed in the arcuate collars 240 which will also fit the internal surface of the case. Each of the collars has a projection 241 axially loosely engaging with one of recesses 247 formed at both ends of the spring retainer 243. Each of the recesses is in this instance formed in aligned relation with each other. As will be seen in FIG. 11, each of the spring retainers 243 and 243' has two parallel flanges 248 extending perpendicularly therefrom. The flanges have converging cam faces 246 which cooperate with the spider 219 as shown in phantom in FIG. 11. Disposed between the two spring retainers 243 and 243' are suitable number of compressed springs 244 as shown in FIG. 7. Both axle shafts not shown are inserted from the opposed sides of the device so that splined ends of them fit inside of the corresponding side gears and the side gears may transmit side gear thrust from the bevel gear teeth directly into the both clutches thus being clamped, during the operation of the device, between the side gears and inside of the case.

The operation of the differential in FIGS. 7-11 is similar in principal to that already described.

Before entering the description of the function of the device, it should be noted that the right side clutch 209' is of identical construction with that of the other side clutch 209.

To illustrate the action, assume that straightway driving is to be transmitted to the wheels, the rotation of the case is caused through the ring gear (not shown) bolted thereto as at hole 224a. The rotation of the case causes in turn the side gears 205 and 205' to both revolve at the same rate of speed, since the connecting pinion gears both are moved with the case, but do not revolve. Under ordinary conditions, both axles are rotated directly by the case through the above described connection without any cooperation of the clutch mechanism.

If left side drive wheel is on a low traction surface or is the, inside wheel of the turn and bounces from the traveled surface, that drive wheel would accelerate. The side gear 205 will accordingly tend to increase its rotational speed with the consequence that it is faster than the case, whereas the other side wheel will slow down and cause the side gear 205' to rotate slower than the case. In this instance, both clutches become the brake clutches of the side gears as hereinafter will be described.

During the operation of the device, the clutch 209 is continuously clamped between the wall of the case and the back of the side gear by the spring 244 and the side gear thrust from the bevel gear teeth so that all the clutch plates of the clutch are tightened to each other. The clutch plates 211 are solidly connected for rotation with the side gear 205 whereas the clutch plates 210 are connected to the collars 240 through its projections 215 and recesses 242 of the collars. The collars are for turn connected in rotation with the spring retainer 243 through their projections 241 and recesses 247 of the retainer. Further, the cam face 246 always engages the spider 219.

The essential principle of the device is that the side gear 205 transmits the resulting higher speed to the spring retainer 243 through the clutch 209. This spring retainer also receives a slower speed from the spider 219 through the cam faces. In any case the retainer continuously compares the actual speed of the side gear with the speed of the case and translates every discrepancy into exactly the increase (or decrease) of the endwise press into the clutch 209 necessary to correct the erroneous increase of speed of the side gear, so that the clutch 209 becomes the brake clutch or speed regulating clutch of the side gear 205.

The brake reaction force will return back to the cam assembly with the consequence that the spider will further move up on the higher rise of the cam face 246 and the further endwise movement of the retainer is correspondingly effected, rapid restraining of the acceleration thus resulting from such circular operation as to the side gear 205.

It should be noted that outside surfaces of the side gears 205 and 205' transmit continuous side gear thrust (from the bevel gear teeth) directly into the clutch stacks and consequently without any tendency of the hubs of the side gear to bear against the wall of the case. There is substantial clearance provided as will be seen in FIG. 7 between the hub of the side gears 205, 205' and the wall of the case.

Further description will be abbreviated as to the operations of the embodiment because of the fact that such operation will be exactly like those already described hereinbefore.

Figure 12:
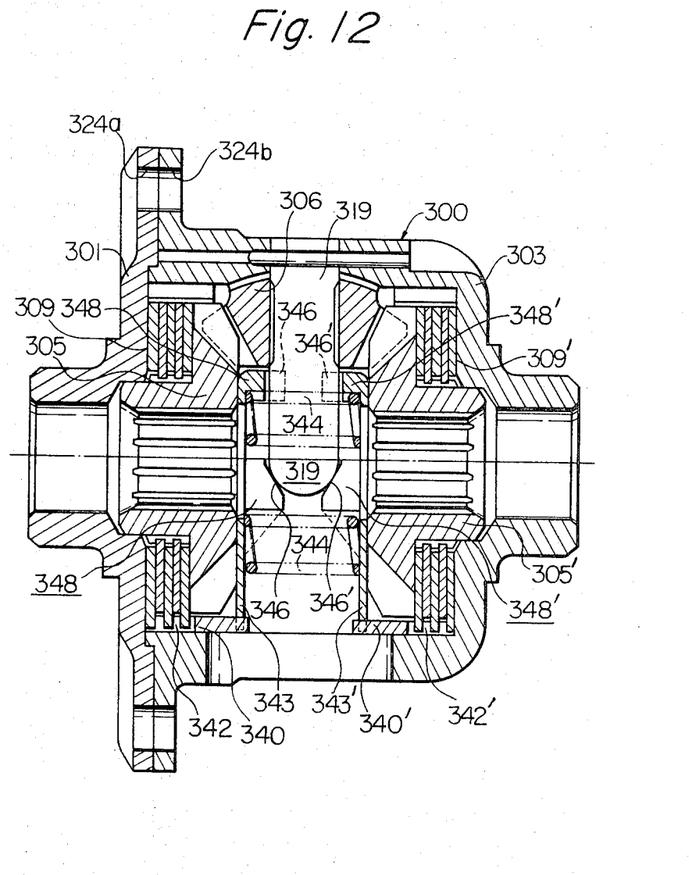
FIG. 12 is a sectional view taken along the line XII of FIG. 13.
Figure 13:
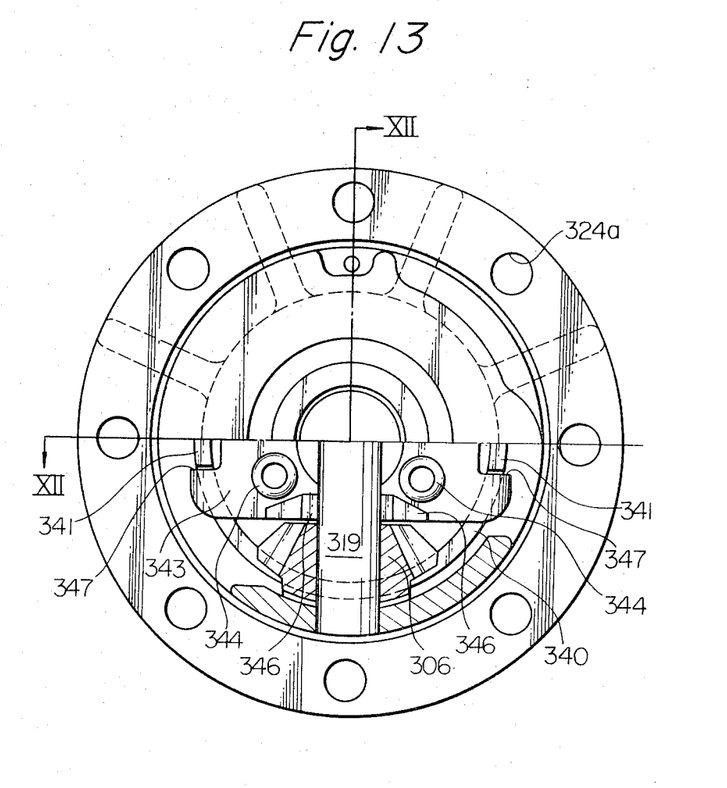
FIG. 13 is a side view similar to FIG. 8 of the embodiment shown in FIGS. 12–14.
Figure 14:
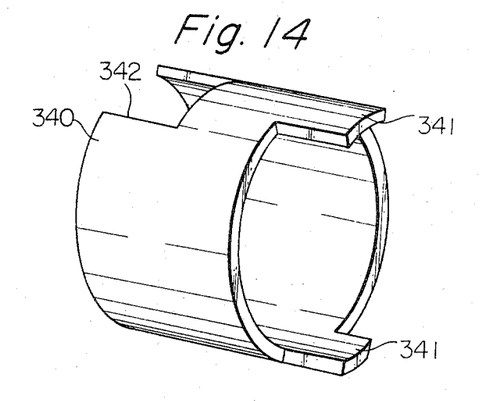
FIG. 14 is a perspective view of the collar.

Turning now to FIGS. 12–14, an embodiment of the invention shown in these FIGS. has a two-piece case 300 comprising housing 303 and a cover 301 which may be bolted together and to a ring (not shown) through aligned openings 324a and 324b. Further, this embodiment has a one-piece collar 340 as shown in FIG. 14 for assembling. There is no difference in construction between the devices shown in FIGS. 7–11 and FIGS. 12–14 except that the two-piece case and one-piece collar of the latter are substituted for the one-piece case and two piece collar of the former respectively.

The operation of the former is exactly like that of the latter. The description as to the operation will consequently be abbreviated because of the fact that the same parts as those of the embodiment shown in FIGS. 7–11 are given the same number in a 300 series and the operation will readily be understood from the illustration and such symbolization.

What is claimed is:

1. A differential for receiving torque from a power source and delivering it to two separate coaxial output axles comprising a rotatable case driven by the power source, a pair of axially separated side gears disposed inside said case and mounted on the output axles respectively, for drive connection therewith, a plurality of pinion bevel gears disposed inside said case and in engagement with said side gears to provide a differential gearing, a spider extending transversely across the axis of the output axles and rotating with said case, said pinion bevel gears being mounted for free rotation on said spider, multiple friction disc clutch means operatively connected to said case and said side gears, said clutch means normally tending to be engaged for operation by the thrust of said side gears caused by said pinion bevel gears, cam means including cam faces formed on said spider and followers to cooperate with said cam faces respectively, said cam means translating variations of speed of rotation of said side gears compared with the speed of rotation of said case into pressure applied to said clutch means to further tighten same, transmitting means including a pair of spring retainers forming said cam followers and axially separated and disposed between said spider and said side gears respectively and a pair of collars engaging with said spring retainers at remoter positions on said spring retainers than said cam means from the axis of said axles, said transmitting means transmitting brake force derived from said clutch means to said cam means when said variations of speed occur, whereby said braking force is applied back to said cam means for translation into additional force to said clutch means.

2. A differential as set forth in claim 1 wherein said spring retainers receive springs at their ends so that each spring retainer is urged apart relative to said case to apply pressure to said corresponding clutch means.

* * * * *

UNITED STATES PATENT OFFICE
CERTIFICATE OF CORRECTION

Patent No. 3,791,237                     Dated February 12, 1974

Inventor(s) SHIN KITANO: TOORU KAGATA

It is certified that error appears in the above-identified patent and that said Letters Patent are hereby corrected as shown below:

[30]   Foreign application Priority data

April 22, 1970 .........Japanese Appln. 45-34591

June 2, 1970 .........Japanese Appln. 45-47787

Signed and sealed this 17th day of September 1974.

(SEAL)
Attest:

McCOY M. GIBSON JR.　　　　　　　　　C. MARSHALL DANN
Attesting Officer　　　　　　　　　　Commissioner of Patents